(12) United States Patent
Goto et al.

(10) Patent No.: US 7,359,778 B2
(45) Date of Patent: Apr. 15, 2008

(54) VEHICLE STEERING APPARATUS

(75) Inventors: Takeshi Goto, Toyota (JP); Tatsuo Sugitani, Nishikamo-gun (JP); Ryuichi Kurosawa, Okazaki (JP); Toshiyuki Mikida, Anpachi-gun (JP); Kenji Tozu, Yokkaichi (JP)

(73) Assignees: Toyota Jidosha Kabushiki Kaisha, Toyota (JP); Aisin Seiki Kabushiki Kaisha, Kariya-shi (JP)

( * ) Notice: Subject to any disclaimer, the term of this patent is extended or adjusted under 35 U.S.C. 154(b) by 387 days.

(21) Appl. No.: 11/132,412

(22) Filed: May 19, 2005

(65) Prior Publication Data
US 2006/0011404 A1 Jan. 19, 2006

(30) Foreign Application Priority Data
May 26, 2004 (JP) ............................. 2004-155667

(51) Int. Cl.
B62D 5/04 (2006.01)
(52) U.S. Cl. ................... 701/41; 180/443; 180/446
(58) Field of Classification Search ................ 701/41, 701/42; 180/410, 413, 421, 422, 443, 446
See application file for complete search history.

(56) References Cited

U.S. PATENT DOCUMENTS

| | | | | |
|---|---|---|---|---|
| 4,412,594 A | * | 11/1983 | Furukawa et al. | 180/414 |
| 5,265,019 A | * | 11/1993 | Harara et al. | 701/41 |
| 6,173,221 B1 | | 1/2001 | Boehringen et al. | |
| 6,580,988 B2 | * | 6/2003 | Lin et al. | 701/41 |
| 6,655,490 B2 | * | 12/2003 | Andonian et al. | 180/402 |
| 7,203,582 B2 | * | 4/2007 | Yokota | 701/41 |
| 7,295,908 B2 | * | 11/2007 | Goto et al. | 701/43 |
| 2005/0209751 A1 | * | 9/2005 | Kato | 701/41 |
| 2006/0047391 A1 | * | 3/2006 | Katou | 701/41 |

FOREIGN PATENT DOCUMENTS

| JP | A 11-124047 | 5/1999 |
|---|---|---|
| JP | A 2000-085604 | 3/2000 |

* cited by examiner

*Primary Examiner*—Gary Chin
(74) *Attorney, Agent, or Firm*—Oliff & Berridge, PLC

(57) ABSTRACT

In a vehicle steering apparatus, front wheels are controlled to be turned by a computer program processing. A displacement/torque conversion section 51 converts a steering angle θ into a steering torque Td that is in relation of exponential function. A torque/lateral-acceleration conversion section 52, torque/yaw-rate conversion section 53 and torque/curvature conversion section 54 convert into an anticipated lateral acceleration Gd, anticipated yaw rate γd and anticipated turning curvature ρd based upon the steering torque Td. Turning angle conversion sections 55, 56 and 57 calculate target turning angles δg, δγ and δρ. A turning angle deciding section 58 decides a target turning angle δd among the target turning angles δg, δγ and δρ according to the detected vehicle speed V. A turning control section 60 controls the steered wheels to be turned into the target turning angle δd. Herewith, the vehicle steering apparatus of the present invention can turn the vehicle so as to be adapted to a man's perception characteristic in all speed areas with respect to an operation on a steering handle by a driver. Therefore, the driver can easily drive the vehicle in all speed areas.

16 Claims, 8 Drawing Sheets

VEHICLE STEERING APPARATUS

BACKGROUND OF THE INVENTION

1. Field of the Invention

The present invention relates to a vehicle steering apparatus of a steer-by-wire system provided with a steering handle operated by a driver for steering a vehicle, a turning actuator for turning steered wheels and a turning control device that drive-controls the turning actuator according to the operation on the steering handle for turning the steered wheels.

2. Description of the Related Art

The development of the steering apparatus of a steer-by-wire system of this type has recently been carried out positively. For example, the following Patent Reference 1 discloses a steering apparatus that detects a steering angle and a vehicle speed, calculates a transmission ratio that decreases with the increase in the steering angle and increases with the increase in the vehicle speed, calculates the turning angle (displacement amount of a rack shaft) of a front wheel by dividing the steering angle by this transmission ratio and turns the front wheel into the calculated turning angle. In this steering apparatus, the calculated turning angle is corrected according to the steering speed that is obtained by time-differentiating the detected handle steering angle, thereby enhancing the steering response and tracking performance of the front wheel. Further, a target yaw rate is calculated by using the detected vehicle speed and the detected handle steering angle, and the calculated turning angle is corrected according to the difference between the calculated target yaw rate and the detected actual yaw rate, thereby realizing the turning control considering the vehicle behavior.

The following Patent Reference 2 discloses a steering apparatus that detects a steering torque and a handle steering angle, calculates two turning angles that increase with the increase in the steering torque and the handle steering angle, and turns the front wheel into the turning angle that is obtained by adding up these calculated turning angles. In this steering apparatus, the vehicle speed is also detected, wherein both turning angles are corrected by this detected vehicle speed, thereby changing the turning characteristic according to the vehicle speed.

[Patent Reference 1]

Japanese Unexamined Patent Application No. 2000-85604

[Patent Reference 2]

Japanese Unexamined Patent Application No. HEI11-124047

The conventional both apparatuses detect the steering angle and steering torque that are operation input values by a driver to a steering handle for steering the vehicle, directly calculates the turning angle of the front wheel by using these detected steering angle and steering torque, and turns the front wheel into the calculated turning angle. However, although the mechanical connection between the steering handle and the steered wheels is unlocked, these turning controls of the front wheel are totally the same in the basic technical concept wherein the turning angle of the front wheel is decided so as to correspond to the steering position and steering force of the steering handle from the viewpoint of a steering method of the front wheel with respect to the operation of the steering handle. The turning angle of the front wheel is not decided so as to correspond to a man's sensory characteristic by these turning methods, so that the driver has a sense of incongruity and has a hard time for driving the vehicle.

Specifically, in the conventional apparatuses, the turning angle that cannot be perceived by the driver is directly decided so as to correspond to the operation of the steering handle, and the vehicle is turned by the turning of the front wheel according to the steering angle. The driver has sensed with a sense of touch or sight the lateral acceleration, yaw rate and turning curvature of the vehicle caused by the turn of the vehicle and has fed them back to the operation of the steering handle for turning the vehicle in a desired manner. In other words, the turning angle of the front wheel with respect to the operation of the steering handle by the driver is a physical quantity that a man cannot perceive. Therefore, the turning angle directly decided with respect to the steering operation by the driver is not decided so as to be adapted to the driver's perception characteristic, with the result that the driver has a sense of incongruity. This makes it difficult for the driver to drive the vehicle.

In the conventional apparatuses, the decided turning angle is corrected according to the difference between the target yaw rate, which is calculated by using the detected vehicle speed and the detected handle steering angle, and the detected actual yaw rate. This is only a correction of the turning angle considering the vehicle behavior, so that the turning angle is not decided according to the yaw rate that the driver is to perceive by the operation of the steering handle. Accordingly, in this case too, the turning angle decided with respect to the steering operation of the driver is not decided so as to be adapted to the driver's perception characteristic, and hence, this makes it difficult for the driver to drive the vehicle.

In order to cope with the aforesaid problem, the present inventors have grappled with the research of a vehicle steering apparatus that can steer a vehicle as adapted to a man's perception characteristic with respect to an operation of a steering handle by a driver. As for the man's perception characteristic described above, the Weber-Fechner's law states that human sensory amount is proportional to the logarithm of a physical quantity of given stimulation. In other words, if the physical quantity of the stimulation given to a human with respect to the operation amount by the human is changed in the manner of exponential function in case where the operation amount is a displacement, or if the aforesaid physical quantity is changed in the manner of exponentiation function in case where the operation amount is a torque, the relationship between the operation amount and the physical quantity can be adapted to the man's perception characteristic. The present inventors have found the following, as a result of applying the Weber-Fechner's law to a vehicle steering operation.

Upon driving a vehicle, the vehicle turns by the operation on a steering handle. The turn of the vehicle changes vehicle motion state quantity such as the lateral acceleration, yaw rate, turning curvature or the like. The driver senses this vehicle motion state quantity with a sense of touch or sight. Therefore, if the vehicle motion state quantity that a driver can perceive is changed in the manner of exponential function or in the manner of exponentiation function with respect to the operation on the steering handle by the driver, he/she can drive the vehicle by operating the steering handle as adapted to the perception characteristic.

SUMMARY OF THE INVENTION

The present invention is based upon the above-mentioned finding, and aims to provide a vehicle steering apparatus wherein a vehicle is steered as adapted to a man's perception characteristic by the operation on a steering handle by a driver, whereby a vehicle is easy to be driven in all speed areas.

In order to attain the foregoing object, the present invention is characterized in that, in a vehicle steering apparatus of a steer-by-wire system provided with a steering handle operated by a driver for steering a vehicle, a turning actuator for turning steered wheels and a turning control device that drives and controls the turning actuator according to the operation on the steering handle for turning the steered wheels, wherein the turning control device comprises: operation input value detecting means that detects an operation input value by a driver to the steering handle; vehicle speed detecting means that detects a vehicle speed; motion state quantity calculating means that calculates plural anticipated motion state quantities of the vehicle by using the detected operation input value, wherein the plural anticipated motion state quantities of the vehicle represent the vehicle motion state, that relates to a turn of the vehicle and can be sensed by a driver, and are in the predetermined relation of exponential function or in the predetermined relation of exponentiation function with the operation input value to the steering handle; turning angle calculating means that calculates a turning angle of the steered wheels necessary for the vehicle to turn with each of the anticipated motion state quantities calculated by the motion state quantity calculating means by using each of the anticipated motion state quantities; turning angle deciding means that selects and decides at least one turning angle, among each of the turning angles, that correspond to each of the anticipated motion state quantities and are calculated by the turning angle calculating means, based upon the vehicle speed detected by the vehicle speed detecting means; and turning control means that controls the turning actuator according to the turning angle decided by the turning angle deciding means for turning the steered wheels into the decided turning angle.

In this case, the turning angle deciding means may decide at least one turning angle by changing the ratio of each turning angle, that corresponds to each of the anticipated motion state quantities and is calculated by the turning angle calculating means, to the vehicle speed detected by the vehicle speed detecting means. The changed ratio may be represented by a function having the detected vehicle speed as a variable.

Another feature of the present invention is that, in a vehicle steering apparatus of a steer-by-wire system provided with a steering handle operated by a driver for steering a vehicle, a turning actuator for turning steered wheels and a turning control device that drives and controls the turning actuator according to the operation on the steering handle for turning the steered wheels, wherein the turning control device comprises: operation input value detecting means that detects an operation input value by a driver to the steering handle; vehicle speed detecting means that detects a vehicle speed; motion state quantity calculating means that calculates an anticipated motion state quantity of the vehicle by using the detected operation input value, wherein the anticipated motion state quantity of the vehicle represents the vehicle motion state, that relates to a turn of the vehicle and can be sensed by a driver, and is in the predetermined relation of exponential function or in the predetermined relation of exponentiation function with the operation input value to the steering handle; turning angle calculating means that calculates a turning angle of the steered wheels necessary for the vehicle to turn with the anticipated motion state quantity calculated by the motion state quantity calculating means by using the detected vehicle speed and the anticipated motion state quantity; and turning control means that controls the turning actuator according to the turning angle calculated by the turning angle calculating means for turning the steered wheels into the calculated turning angle, wherein the turning angle calculating means calculates the turning angle of the steered wheels with the vehicle speed used for the calculation made constant when the vehicle speed detected by the vehicle speed detecting means is not more than a predetermined vehicle speed.

In these cases, the anticipated motion state quantity is at least one of, for example, a vehicle lateral acceleration, vehicle yaw rate or vehicle turning curvature. In these vehicle steering apparatuses, a reaction force device for giving reaction force to the operation of the steering handle may further be provided.

Further, the operation input value detecting means can be composed of a displacement amount sensor that detects a displacement amount of the steering handle. In this case, the motion state quantity calculating means may be composed of operation force conversion means that converts the detected displacement amount into the operation force exerted on-the steering handle and motion state quantity conversion means that converts the converted operation force into the anticipated motion state quantity. The operation force conversion means may convert the displacement amount into the operation force that is in the relation of exponential function with the displacement amount, while the motion state quantity conversion means may convert the operation force into an anticipated motion state quantity that is in the relation of exponential function with the operation force.

The operation input value detecting means can be composed of, for example, an operation force sensor that detects the operation force exerted on the steering handle. In this case, the motion state quantity calculating means may be composed of motion state quantity conversion means that converts the detected operation force into the anticipated motion state quantity. The motion state quantity conversion means may convert the operation force into an anticipated motion state quantity that is in the relation of exponentiation function with the operation force.

In the present invention having the aforesaid configuration, the operation input value to the steering handle by the driver is firstly converted into the vehicle anticipated motion state quantity (lateral acceleration, yaw rate, turning curvature, etc.) that relates to a turn of the vehicle, can be sensed by a driver and is in the predetermined relation of exponential function or in the predetermined relation of exponentiation function with the operation input value to the steering handle. Then, the turning angle of the steered wheels necessary for the vehicle to turn with the anticipated motion state quantity is calculated based upon the converted anticipated motion state quantity, and the steered wheels are turned into the calculated turning angle. Therefore, when the vehicle turns by the turning of the steered wheels, the anticipated motion state quantity is given to the driver as the "physical quantity of the given stimulation" in accordance with the Weber-Fechner's law. Since the anticipated motion state quantity is changed in the manner of exponential function or in the manner of exponentiation function with respect to the operation input value to the steering handle, the driver can turn the steering handle as perceiving the motion state quantity adapted to a man's perception characteristic. The driver can tactilely sense the lateral acceleration and yaw rate by the contact to each section in the vehicle. The driver can visually sense the turning curvature by the change in the condition within the vehicle view area. As a result, the driver can turn the steering handle as adapted to the man's perception characteristic, whereby the driver can easily drive the vehicle without having a sense of incongruity.

Further, plural anticipated motion state quantities are calculated and the turning angles each corresponding to each of the plural anticipated motion state quantities are calculated, whereby at least one turning angle can be selected and decided among the calculated turning angles based upon the detected vehicle speed. This makes it possible to turn the steering handle so as to be adapted to a man's perception characteristic in all speed areas. Specifically, the anticipated motion state quantity that can be perceived by a driver is different depending upon the vehicle speed, when the driver turns the vehicle. More specifically, in case where the vehicle speed is great, for example, the driver is easy to sense the lateral acceleration as the anticipated motion state quantity by the contact to each section in the vehicle. On the other hand, in case where the vehicle speed is small, the driver is difficult to sense the lateral acceleration, but the driver is easy to sense the turning curvature as the anticipated motion state quantity by the change in the condition within the vehicle view area. In this manner, the anticipated motion state quantity that the driver can perceive is different depending upon the change in the vehicle speed. Therefore, when the vehicle speed is great, for example, the turning angle corresponding to the lateral acceleration is selected and decided as the anticipated motion state quantity, whereby the driver can turn the steering handle as adapted to a man's perception characteristic. Accordingly, the driver can easily drive the vehicle without having a sense of incongruity. On the other hand, when the vehicle speed is small, the turning angle corresponding to the turning curvature is selected and decided as the anticipated motion state quantity, whereby the driver can turn the steering handle as adapted to a man's perception characteristic. Accordingly, the driver can easily drive the vehicle without having a sense of incongruity.

Upon deciding the turning angle according to the vehicle speed, the turning angle can be decided by changing the ratio (or gain) of each turning angle, corresponding to each of the plural anticipated motion state quantities, to the vehicle speed. This ratio can be represented by a function having the vehicle speed as a variable. According to this, when the turning angle is suitably selected and decided in accordance with the change in the vehicle speed, the optimum turning angle can continuously be selected and decided with respect to the vehicle speed. Specifically, in case where the vehicle speed decreases and the turning angle corresponding to the turning curvature is selected and decided from the state where the vehicle speed is great and the turning angle corresponding to the lateral acceleration is selected and decided, for example, the ratio of the turning angle corresponding to the lateral acceleration is continuously decreased according to the decrease in the vehicle speed and the ratio of the turning angle corresponding to the turning curvature is continuously increased according to the decrease in the vehicle speed, thereby being capable of finally selecting and deciding the turning angle corresponding to the turning curvature. The ratio of the turning angle is continuously changed according to the vehicle speed to select the optimum turning angle, whereby the turning angle can be smoothly changed to the selected turning angle and decided so as to correspond to the vehicle speed. Therefore, the driver can easily drive the vehicle without having a sense of incongruity. Further, the turning angle can more smoothly be changed and decided by changing the ratio based upon the function having the vehicle speed as a variable.

When the detected vehicle speed is not more than the predetermined vehicle speed, the vehicle speed used for the calculation of the turning angle can be made constant. The reason of this is as follows. It is desired that the steered wheels are greatly turned with respect to the operation of the steering handle by a driver, i.e., the turning angle is increased, as the vehicle speed is decreased such as the case of parking the vehicle. However, in case where the turning angle is calculated to be great as the vehicle speed is decreased, there may be the case where the calculated turning angle shows the maximum, which is not realistic. On the other hand, performing the calculation with the vehicle speed made constant can prevent the turning angle from showing the maximum, so that the realistic turning angle can be calculated, in case where the vehicle speed is not more than the predetermined vehicle speed. In this case, the driver can turn the steering handle based upon the anticipated motion state quantity, and hence, the driver can easily drive the vehicle without having a sense of incongruity.

Although the driver is difficult to sense the lateral acceleration as described above when the lateral acceleration is adopted as the anticipated motion state quantity in case where the vehicle speed is small, it is possible for the driver to operate the steering handle to turn the vehicle based upon this anticipated motion state quantity (lateral acceleration). Therefore, the driver can operate the steering handle in all speed areas based upon the lateral acceleration serving as the anticipated motion state quantity, even if plural anticipated motion state quantities are not calculated. Accordingly, the selection and decision of the turning angle can be omitted, with the result that the turning control device can be simplified.

Still another feature of the present invention is that, in addition to the aforesaid configuration, the invention is provided with motion state quantity detecting means that detects actual motion state quantity that is the same type of the anticipated motion state quantity and represents the actual motion state, and correcting means that corrects the calculated turning angle according to the difference between the calculated anticipated motion state quantity and the detected actual motion state quantity. This allows the steered wheels to be correctly turned into the turning angle necessary for the vehicle to drive with the calculated anticipated motion state quantity. As a result, the driver can operate the steering handle, while perceiving the motion state quantity adapted to a man's perception characteristic, whereby driving the vehicle is more facilitated.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENTS

First Embodiment

Figure 1:
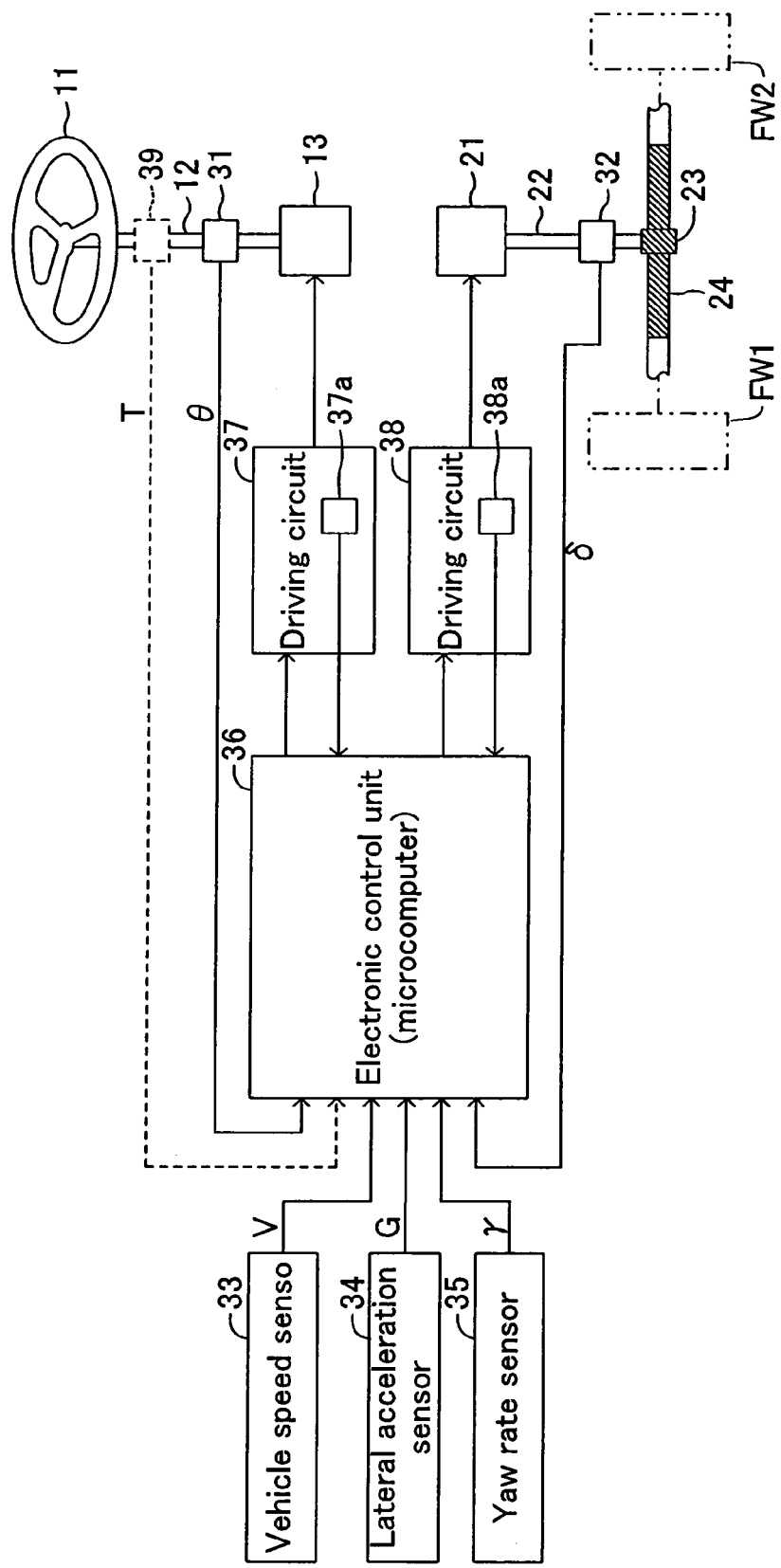
FIG. 1 is a schematic view of a vehicle steering apparatus common to first to third embodiments of the present invention.

A vehicle steering apparatus according to a first embodiment of the present invention will be explained hereinafter with reference to the drawings. FIG. 1 is a block diagram schematically showing the vehicle steering apparatus according to the first embodiment.

This steering apparatus is provided with a steering handle 11 as an operating section that is turned by a driver for steering left and right front wheels FW1 and FW2, those of which are steered wheels. The steering handle 11 is fixed to the upper end of a steering input shaft 12. The lower end of the steering input shaft 12 is connected to a reaction force actuator 13 composed of an electric motor and deceleration mechanism. The reaction force actuator 13 exerts reaction force on the turning operation of the steering handle 11 by a driver.

This steering apparatus is further provided with a turning actuator 21 composed of an electric motor and a deceleration mechanism. The turning force by the turning actuator 21 is transmitted to the right and left front wheels FW1 and FW2 via a turning output shaft 22, pinion gear 23 and rack bar 24. According to this configuration, the rotational force from the turning actuator 21 is transmitted to the pinion gear 23 via the turning output shaft 22, whereby the rotation of the pinion gear 23 displaces the rack bar 24 in the axial direction. The displacement of the rack bar 24 in the axial direction allows the right and left front wheels FW1 and FW2 to be turned to the right or to the left.

Subsequently explained is an electronic controller for controlling the rotations of the reaction force actuator 13 and the turning actuator 21. The electronic controller has a steering angle sensor 31, turning angle sensor 32, vehicle speed sensor 33, lateral acceleration sensor 34 and yaw rate sensor 35.

The steering angle sensor 31 is attached to the steering input shaft 12. It detects the rotation angle of the steering handle 11 from the neutral position and outputs the detected angle as a steering angle θ. The turning angle sensor 32 is attached to the turning output shaft 22. It detects the rotation angle of the turning output shaft 22 from the neutral position and outputs the detected angle as an actual turning angle δ (corresponding to the turning angles of the right and left front wheels FW2 and FW2). It should be noted that the steering angle θ and the actual turning angle δ represents such that, with their neutral position defined as "0", the rotation angle in the leftward direction is represented by a positive value and the rotation angle in the rightward direction is represented by a negative value. The vehicle speed sensor 33 detects a vehicle speed V and outputs the detected speed. The lateral acceleration sensor 34 detects the actual lateral acceleration G of the vehicle and outputs the resultant. The yaw rate sensor 35 detects the actual yaw rate γ of the vehicle and outputs the resultant. The actual lateral acceleration G and the actual yaw rate γ are also represented such that the acceleration and yaw rate in the leftward direction are represented by a positive value and the acceleration and yaw rate in the rightward direction are represented by a negative value.

These sensors 31 to 35 are connected to an electronic control unit 36. The electronic control unit has a microcomputer, composed of CPU, ROM, RAM or the like, as a main component. The electronic control unit 36 controls respectively the operations of the reaction force actuator 13 and the turning actuator 21 by the execution of a program. Driving circuits 37 and 38 for driving the reaction force actuator 13 and the turning actuator 21 are connected to the output side of the electronic control unit 36. Disposed in the driving circuits 37 and 38 are current detectors 37a and 38a for detecting driving current flowing through the electric motors in the reaction force actuator 13 and the turning actuator 21. The driving current detected by the current detectors 37a and 38a is fed back to the electronic control unit 36 for controlling the drive of both electric motors.

Figure 2:
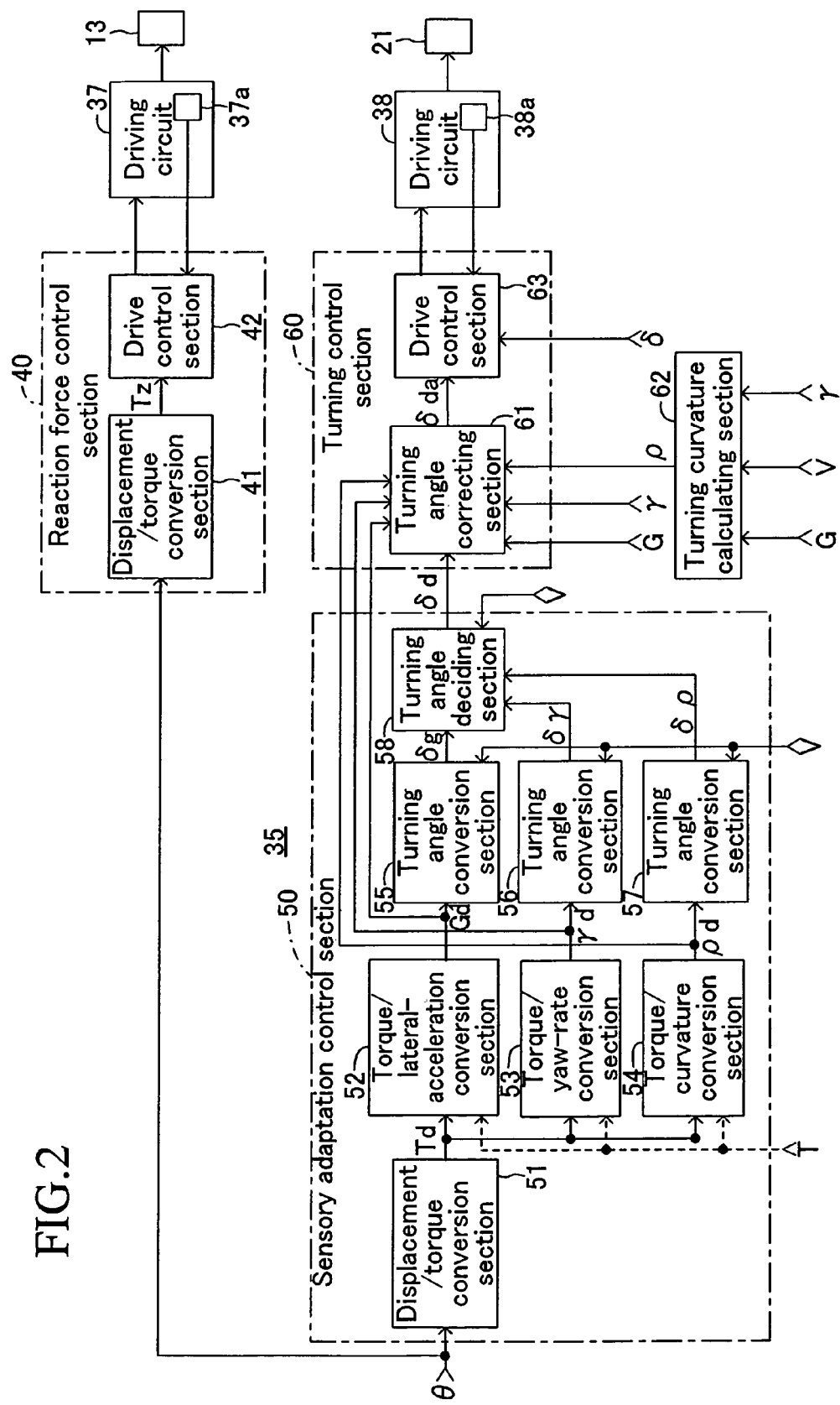
FIG. 2 is a functional block diagram functionally showing a computer program processing executed by an electronic control unit of FIG. 1 according to the first embodiment.

Subsequently, the operation of the first embodiment having the above-mentioned configuration will be explained with reference to a functional block diagram shown in FIG. 2 showing a function realized by a computer program process in the electronic control unit 36. The electronic control unit 36 comprises a reaction force control section 40 for controlling the exertion of reaction force to the steering handle 11, a sensory adaptation control section 50 for deciding a target turning angle δd of the right and left front wheels FW1 and FW2 corresponding to the sensation of a driver based upon the turning operation of the steering handle 11 and a turning control section 60 for controlling to turn the right and left front wheels FW1 and FW2 based upon the target turning angle δd.

When the driver turns steering handle 11, the steering angle sensor 31 detects the steering angle θ that is a rotation angle of the steering handle 11. The detected steering angle θ is outputted to the reaction force control section 40 and the sensory adaptation control section 50 respectively. In the reaction force control section 40, a displacement/torque conversion section 41 calculates reaction force torque $T_z$, that is the exponential function of the steering angle θ, by using the following equation 1.

$$T_z = T_0 \cdot \exp(K1 \cdot \theta) \qquad \text{Equation 1}$$

Figure 3:
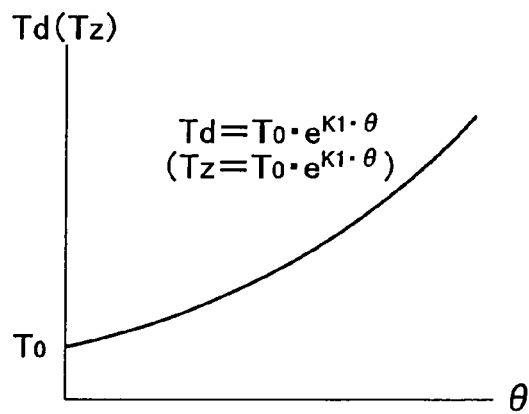
FIG. 3 is a graph showing a relationship between a steering angle and a steering torque.

In this equation, To and K1 are constants, and they will be explained in more detail in the later-described explanation about the sensory adaptation control section 50. The steering angle θ in the equation 1 represents an absolute value of the detected steering angle θ. Therefore, if the detected steering angle θ is positive, the constant To is made negative, while if the detected steering angle θ is negative, the constant To is made positive having the absolute value same as the negative constant To. The reaction force torque $T_z$ may be calculated by using a conversion table having a characteristic shown in FIG. 3 and having stored therein the reaction force torque $T_z$ with respect to the steering angle θ, instead of the calculation of the equation 1.

The calculated reaction force torque $T_z$ is supplied to a drive control section 42. The drive control section 42 inputs driving current flowing through the electric motor in the reaction force actuator 13 from the driving circuit 37 and feedback-controls the driving circuit 37 such that the driving current corresponding to the reaction force torque $T_z$ flows through the electric motor. The drive control of the electric motor in the reaction force actuator 13 causes the electric motor to exert the reaction force torque $T_z$ on the steering handle 11 via the steering input shaft 12. Accordingly, the driver turns the steering handle 11, feeling the reaction force torque $T_z$ that is changed in a manner of exponential function to the steering angle θ, i.e., adding steering torque, that is equal to the reaction force torque $T_z$, to the steering handle 11. The relationship between the steering angle θ and the reaction force torque $T_z$ is also in accordance with the Weber-Fechner's law, wherein the driver can turn the steering handle 11, receiving from the steering handle 11 a sensation adapted to a man's perception characteristic.

On the other hand, the steering torque Td is calculated at the displacement/torque conversion section 51 according to the following equation 2, that is similar to the equation 1, from the steering angle θ inputted at the sensory adaptation control section 50.

$$Td = To \cdot \exp(K1 \cdot \theta) \quad \text{Equation 2}$$

In this case, To and K1 in the equation 2 are constants similar to those in the equation 1. The steering angle θ in the equation 2 represents an absolute value of the detected steering angle θ. Therefore, if the detected steering angle θ is positive, the constant To is made positive, while if the detected steering angle θ is negative, the constant To is made negative having the absolute value same as the positive constant To. The steering torque Td may also be calculated by using a conversion table having a characteristic shown in FIG. 3 and having stored therein the steering torque Td with respect to the steering angle θ, instead of the calculation of the equation 2.

The calculated steering torque Td is supplied to the torque/lateral-acceleration conversion section 52, torque/yaw-rate conversion section 53 and torque/curvature conversion section 54. The torque/lateral-acceleration conversion section 52 sets an anticipated lateral acceleration Gd, that is anticipated by the driver from the turning operation of the steering handle 11, to "0" as disclosed in the following equation 3, when the absolute value of the steering torque Td is less than a positive small predetermined value To, while it calculates the anticipated lateral acceleration Gd according to the following equation 4, when the absolute value of the steering torque Td is not less than the positive small predetermined value To.

$$Gd = 0 \quad (|Td| < T0) \quad \text{Equation 3}$$

$$Gd = C \cdot Td^{K2} \quad (T0 \leq |Td|) \quad \text{Equation 4}$$

Figure 4:
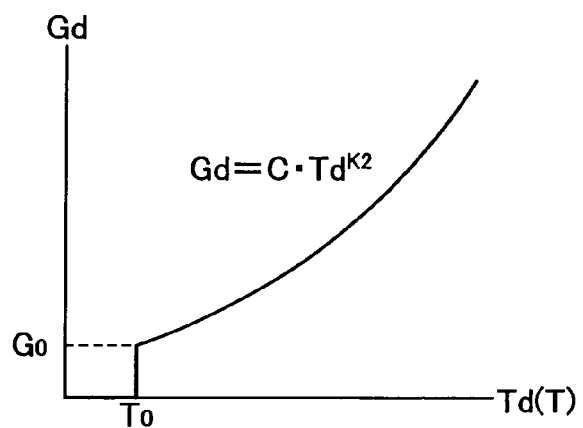
FIG. 4 is a graph showing a relationship between a steering torque and an anticipated lateral acceleration.

C and K2 in the equation 4 are constants. The steering torque Td in the equation 4 represents an absolute value of the steering torque Td calculated by using the equation 2. Therefore, if the calculated steering torque Td is positive, the constant C is made positive, while if the calculated steering torque Td is negative, the constant C is made negative having the absolute value same as the positive constant C. The anticipated lateral acceleration Gd may also be calculated by using a conversion table having a characteristic shown in FIG. 4 and having stored therein the anticipated lateral acceleration Gd with respect to the steering torque Td, instead of the calculations of the equations 3 and 4.

The torque/yaw-rate conversion section 53 sets an anticipated yaw rate γd anticipated by the driver from the turning operation of the steering handle 11 to "0" as disclosed in the following equation 5, if the absolute value of the steering torque Td is less than the positive small predetermined value To, while it calculates the anticipated yaw rate γd in accordance with the following equation 6, if the absolute value of the steering torque Td is not less than the positive small predetermined value To.

$$\gamma d = 0 \quad (|Td| < To) \quad \text{Equation 5}$$

$$\gamma d = C \cdot Td^{K2} \quad (To \leq |Td|) \quad \text{Equation 6}$$

Figure 5:
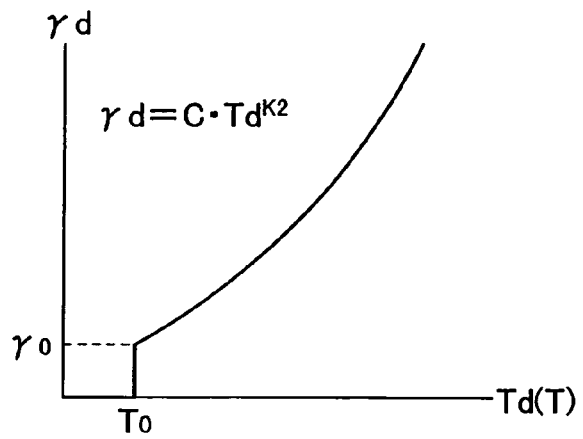
FIG. 5 is a graph showing a relationship between a steering torque and an anticipated yaw rate.

C and K2 in the equation 6 are constants like the equation 4. The steering torque Td in the equation 6 also represents an absolute value of the steering torque Td calculated by using the equation 2. Therefore, if the calculated steering torque Td is positive, the constant C is made positive, while if the calculated steering torque Td is negative, the constant C is made negative having the absolute value same as the positive constant C. The anticipated yaw rate γd may also be calculated by using a conversion table having a characteristic shown in FIG. 5 and having stored therein the anticipated yaw rate γd with respect to the steering torque Td, instead of the calculations of the equations 5 and 6.

The torque/curvature conversion section 54 sets an anticipated turning curvature ρd anticipated by a driver from the turning operation of the steering handle 11 to "0" as disclosed in the following equation 7, if the absolute value of the steering torque Td is less than the positive small predetermined value To, while it calculates the anticipated turning curvature ρd in accordance with the following equation 8, if the absolute value of the steering torque Td is not less than the positive small predetermined value To.

$$\rho d = 0 \quad (|Td| < To) \quad \text{Equation 7}$$

$$\rho d = C \cdot Td^{K2} \quad (To \leq |Td|) \quad \text{Equation 8}$$

Figure 6:
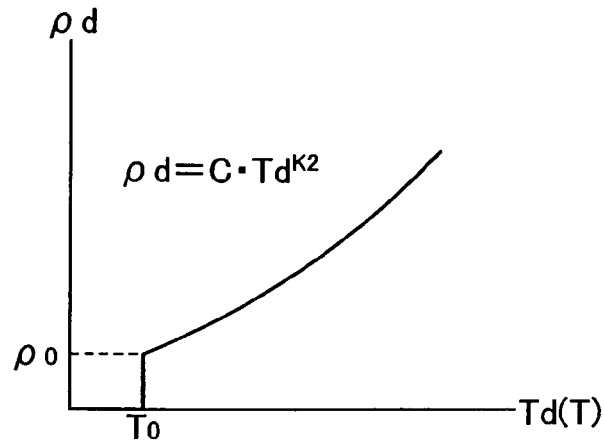
FIG. 6 is a graph showing a relationship between a steering torque and an anticipated turning curvature.

C and K2 in the equation 8 are constants like the equation 4. The steering torque Td in the equation 6 also represents an absolute value of the steering torque Td calculated by using the equation 2. Therefore, if the calculated steering torque Td is positive, the constant C is made positive, while if the calculated steering torque Td is negative, the constant C is made negative having the absolute value same as the positive constant C. The anticipated turning curvature ρd may also be calculated by using a conversion table having a characteristic shown in FIG. 6 and having stored therein the anticipated turning curvature ρd with respect to the steering torque Td, instead of the calculations of the equations 7 and 8.

The equation 4 will be explained here. It should be noted that the equations 6 and 8 can be changed like the equation 4 in accordance with the following explanation, so that the equation 4 will be explained in detail and the explanation about the equations 6 and 8 are omitted. When the steering torque Td is eliminated by using the equation 2, the following equation 9 is obtained.

$$Gd = C \cdot (To \cdot \exp(K1 \cdot \theta))^{K2} = C \cdot To^{K2} \cdot \exp(K1 \cdot K2 \cdot \theta) = Go \cdot \exp(K1 \cdot K2 \cdot \theta)$$

Equation 9

In the equation 9, Go is the constant $C \cdot To^{K2}$, and the equation 9 shows that the anticipated lateral acceleration Gd is changed in a manner of exponential function with respect to the steering angle θ of the steering handle 11 by the driver. The anticipated lateral acceleration Gd is a physical quantity that the driver can perceive by the contact of a part of the driver's body to a predetermined section in the vehicle, and is in accordance with the Weber-Fechner's law. Accordingly, if the driver can turn the steering handle 11 as perceiving the lateral acceleration equal to the anticipated lateral acceleration Gd, the relationship between the turning operation of the steering handle 11 and the vehicle steering can be associated with the human's perception characteristic.

The anticipated yaw rate γd and the anticipated turning curvature ρd are also changed in the manner of exponential function with respect to the steering angle θ by changing the equations 6 and 8 like the case of changing the equation 4 to the equation 9. Therefore, the anticipated yaw rate γd and the anticipated turning curvature ρd are in accordance with the Weber-Fechner's law. Accordingly, the relationship between the turning operation of the steering handle 11 and the vehicle steering can be associated with the human's perception characteristic.

Since the anticipated lateral acceleration Gd represented by the equation 4 (i.e., equation 9) is changed in the manner of exponential function with respect to the steering angle θ that is the turning amount of the steering handle 11 as described above, the anticipated lateral acceleration Gd is adapted to the human's perception characteristic. Further, the easiest process in the turning operation of the steering handle 11 by the driver is to turn the steering handle 11 at a constant speed ω (θ=ω·t). According to this turning operation, the anticipated lateral acceleration Gd changes in the manner of exponential function with respect to a time t as represented by the following equation 10. Accordingly, it is understood that the turning operation of the steering handle 11 by the driver is facilitated if the driver can turn the steering handle 11 as perceiving the lateral acceleration equal to the anticipated lateral acceleration Gd after this.

$$Gd = Go \cdot \exp(K0 \cdot \omega \cdot t)$$

Equation 10

It should be noted that K0 is a constant having a relationship of $K0 = K1 \cdot K2$.

Further, as represented by the equation 3, the anticipated lateral acceleration Gd is kept to be "0" in case where the steering torque Td is less than the predetermined value To. The reason of this is as follows. The steering torque Td takes the positive predetermined value To by the calculation of the equation 2, even if the steering angle θ is "0", i.e., even if the steering handle 11 is held in the neutral position. If this steering torque Td (=To) is applied to the calculation of the equation 4, the anticipated lateral acceleration Gd becomes a positive value $C \cdot To^{K2}$, but this is not realistic. However, if the steering torque Td is less than the predetermined value To as described above, the anticipated lateral acceleration Gd is "0", whereby this problem can be solved.

Supposing that the minimum steering torque that the driver can perceive is defined as the predetermined value To, the minimum sensible lateral acceleration that the driver can perceive is defined as Go and the predetermined value To has the relationship of $Go = C \cdot To^{K2}$, the anticipated lateral acceleration Gd of a vehicle can be kept to be "0" until the steering torque Td takes the predetermined value To, i.e., until the driver senses the lateral acceleration generated on the vehicle by the turn of the vehicle due to the turning operation of the steering handle 11. According to this, right and left front wheels FW1 and FW2 are controlled to be turned by the turning angle necessary for generating the anticipated lateral acceleration Gd only when the steering handle 11 is steered with not less than the minimum steering torque To. This turning control accurately corresponds to the vehicle steering. It should be noted that the anticipated yaw rate γd and the anticipated turning curvature ρd are also kept to be "0" as represented by the equations 5 and 7, in case where the steering torque Td is less than the predetermined value To. Therefore, they are calculated by the same manner as the aforesaid anticipated lateral acceleration Gd.

Subsequently explained is how to determine the parameters K1, K2 and C (predetermined values K1, K2 and C) used in the equations 1 to 10. In the explanation of how to determine the parameters K1, K2 and C, the steering torque Td is handled as the steering torque T, and as for each equation of the anticipated lateral acceleration Gd, anticipated yaw rate γd and the anticipated turning curvature ρd, the anticipated lateral acceleration Gd is representatively used and handled as the lateral acceleration G. According to the Weber-Fechner's law, "the ratio of ΔS/S of the minimum change ΔS in the physical quantity that the human can perceive and the physical quantity S at this point is constant regardless of the value of the physical quantity S, and this ratio ΔS/S is called the Weber ratio". The present inventors have confirmed that the Weber-Fechner's law is established in the steering torque and the lateral acceleration, and has carried out the following test to various types of people whose sex, age, driving experience, etc. are varied.

As for the steering torque, a torque sensor is attached to the steering handle of a vehicle. Test torque was externally applied to the steering handle and this test torque was varied in various manners, thereby measuring a man's steering torque adjusting ability that he/she gives operation force to the steering handle against this test torque for making an adjustment so as not to rotate the steering handle. Specifically, under the aforesaid condition, the ratio ΔT/T, supposing that the detected steering torque at a certain point is defined as T and the minimum steering torque changing amount that he/se can sense the change from the detected steering torque T is defined as ΔT, i.e., the Weber ratio was measured for various types of people. As a result of this test, the Weber ratio ΔT/T became generally a constant value α for various types of people, regardless of the operating direction of the steering handle, the form of hands gripping the steering handle, magnitude or direction of the test torque or the like.

A test for the lateral acceleration is as follows. A wall member was provided at the side of the driver's seat, and a force sensor for detecting pressing force of a man's shoulder to the wall member was attached. The steering handle was gripped by a man and a man's shoulder was brought into contact with the force sensor on the wall member. Test force was externally applied to the wall member in the widthwise direction with respect to the man and the test force was varied in various manners, thereby measuring a man's lateral force adjusting ability that the man pushed the wall member against this test force so as not to move the wall member, i.e., that the man held his/her posture. Specifically, under this condition, the ratio ΔF/F, supposing that the detected force at a certain point that the man keeps his/her posture as standing the external lateral force is defined as F and the minimum force changing amount that he/se can sense the change from the detected force F is defined as ΔF, i.e., the Weber ratio was measured for various types of people. As a result of this test, the Weber ratio ΔF/F became generally a constant value β for various types of people, regardless of the magnitude or direction of the reference force applied to the wall member.

On the other hand, when the equation 2 is differentiated and the equation 2 is considered in the differentiated equation, the following equation 11 is established.

$$\Delta T = To \cdot \exp(K1 \cdot \theta) \cdot K1 \cdot \Delta\theta = T \cdot K1 \cdot \Delta\theta \quad \text{Equation 11}$$

When this equation 11 is changed and the Weber ratio ΔT/T relating to the steering torque obtained by the above-mentioned test is defined as Kt, the following equation 12 is established.

$$K1 = \Delta T/(T \cdot \Delta\theta) = Kt/\Delta\theta \quad \text{Equation 12}$$

Further, supposing that the maximum steering torque is Tmax, the following equation 13 is established from the equation 2.

$$T\text{max} = To \cdot \exp(K1 \cdot \theta\text{max}) \quad \text{Equation 13}$$

Changing this equation 13 establishes the following equation 14.

$$K1 = \log(T\text{max}/To)/\theta\text{max} \quad \text{Equation 14}$$

Then, the following equation 15 is derived from the equations 12 and 14.

$$\Delta\theta = Kt/K1 = Kt \cdot \text{max}/\log(T\text{max}/To) \quad \text{Equation 15}$$

In this equation 15, Kt is the Weber ratio of the steering torque T, θmax is the maximum value of the steering angle, Tmax is the maximum value of the steering torque, and To corresponds to the minimum steering torque that a man can perceive. These values Kt, θmax, Tmax and To are constants determined by the test and system, so that the differential value Δθ can be calculated by using the equation 15. The predetermined value (coefficient) K1 can also be calculated by using this differential value Δθ and the Weber ratio Kt based upon the equation 12.

When the equation 4 is differentiated and the equation 4 is considered in the differentiated equation, the following equation 16 is established.

$$\Delta G = C \cdot K2 \cdot T^{K2-1} \cdot \Delta T = G \cdot K2 \cdot \Delta T/T \quad \text{Equation 16}$$

When this equation 16 is changed, the Weber ratio ΔT/T relating to the steering torque obtained by the above-mentioned test is defined as Kt and the Weber ratio ΔF/F relating to the lateral acceleration is defined as Ka, the following equations 17 and 18 are established.

$$\Delta G/G = K2 \cdot \Delta T/T \quad \text{Equation 17}$$

$$K2 = Ka/Kt \quad \text{Equation 18}$$

In the equation 18, Kt is the Weber ratio relating to the steering torque and Ka is the Weber ratio relating to the lateral acceleration. Both are given as constants, so that the coefficient K2 can also be calculated based upon the equation 18 by using these Weber ratios Kt and Ka.

Supposing that the maximum value of the lateral acceleration is Gmax and the maximum value of the steering torque is Tmax, the following equation 19 is derived from the equation 4.

$$C = G\text{max}/T\text{max}^{K2} \quad \text{Equation 19}$$

In this equation 19, Gmax and Tmax are constants determined by the test and system, and K2 is calculated by the equation 18, so that the constant (coefficient) C can also be calculated.

As described above, by determining the maximum value θmax of the steering angle θ, maximum value Tmax of the steering torque T, maximum value Gmax of the lateral acceleration G, minimum steering torque To, minimum sensible lateral acceleration Go, the Weber ratio Kt relating to the steering torque T and the Weber ratio Ka relating to the lateral acceleration by the test and system, the coefficients K1, K2 and C in the equations 1 to 9 can be determined beforehand by calculation. Accordingly, the reaction force torque Tz, steering torque Td, anticipated lateral acceleration Gd, anticipated yaw rate γd and anticipated turning curvature ρd, those of which are adapted to the perception characteristic of a driver, can be calculated by using the equations 1 to 9 at the displacement/torque conversion sections 41, 51, torque/lateral-acceleration conversion section 52, torque/yaw-rate conversion section 53 and torque/curvature conversion section 54.

Returning again to the explanation about FIG. 2, the anticipated lateral acceleration Gd, anticipated yaw rate γd and anticipated turning curvature ρd calculated at the torque/lateral-acceleration conversion section 52, torque/yaw-rate conversion section 53 and torque/curvature conversion section 54 are supplied respectively to the turning angle conversion sections 55, 56 and 57. Then, target turning angle δg, target turning angle δγ and target turning angle δρ corresponding to the calculated anticipated lateral acceleration Gd, anticipated yaw rate γd and anticipated turning curvature ρd are calculated at the turning angle conversion sections 55, 56 and 57.

Figure 7:
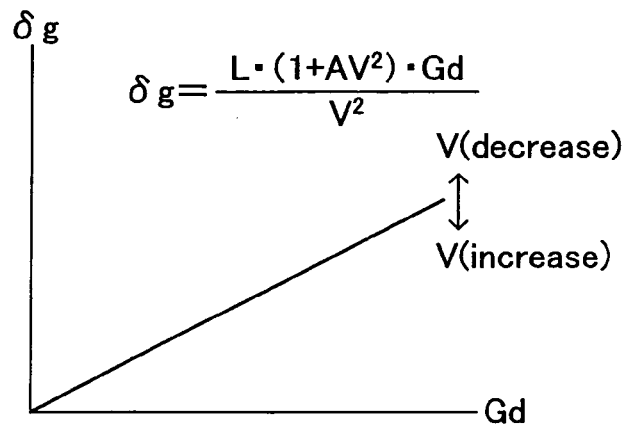
FIG. 7 is a graph showing a relationship between an anticipated lateral acceleration and a target turning angle.

The turning angle conversion section 55 calculates the target turning angle δg of the right and left front wheels FW1 and FW2 necessary for generating the calculated anticipated lateral acceleration Gd. As shown in FIG. 7, the turning angle conversion section 55 has a table representing a changing characteristic of the target turning angle δg, which changes according to the vehicle speed V, with respect to the anticipated lateral acceleration Gd. This table is a set of data collected by running the vehicle as the vehicle speed V is changed and measuring beforehand the turning angle δ of the right and left front wheels FW1 and FW2 and the lateral acceleration G. The turning angle conversion section 55 refers to this table for calculating the target turning angle δg corresponding to the inputted anticipated lateral acceleration Gd and the detected vehicle speed V inputted from the vehicle speed sensor 33. Although the lateral acceleration G (anticipated lateral acceleration Gd) and the target turning angle δg stored in the table are both positive, the outputted target turning angle δg becomes negative if the anticipated lateral acceleration Gd supplied from the torque/lateral-acceleration conversion section 52 is negative.

Since the target turning angle δg is a function of the vehicle speed V and the lateral acceleration G as shown in the following equation 20, the target turning angle δg can also be calculated by the computation of the following equation 20, instead of referring to the table.

$$\delta g = L \cdot (1 + A \cdot V^2) \cdot Gd/V^2 \quad \text{Equation 20}$$

In the equation 20, L is a given value determined beforehand showing a wheel base and A is a given value determined beforehand.

Figure 8:
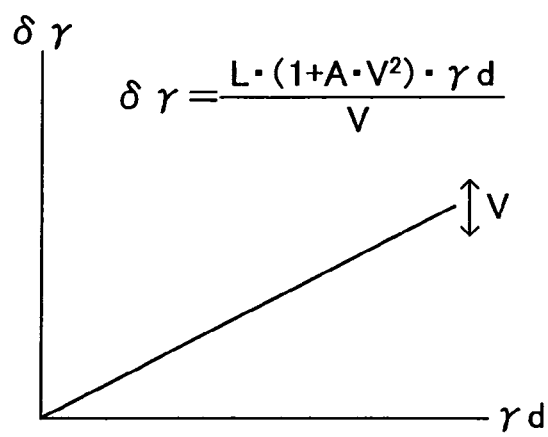
FIG. 8 is a graph showing a relationship between an anticipated yaw rate and a target turning angle.

The turning angle conversion section 56 calculates the target turning angle δγ of the right and left front wheels FW1 and FW2 necessary for generating the calculated anticipated yaw rate γd. As shown in FIG. 8, the turning angle conversion section 56 has a table representing a changing characteristic of the target turning angle δγ, that changes according to the vehicle speed V, with respect to the anticipated yaw rate γd. This table is a set of data collected by running the vehicle as the vehicle speed V is changed and measuring beforehand the turning angle δ of the right and left front wheels FW1 and FW2 and the yaw rate γ. The turning angle conversion section 56 refers to this table for calculating the target turning angle δγ corresponding to the inputted anticipated yaw rate γd and the detected vehicle speed V inputted from the vehicle speed sensor 33. Although the yaw rate γ (anticipated yaw rate γd) and the target turning angle δγ stored in the table are both positive, the outputted target turning angle δγ becomes negative if the anticipated yaw rate γd supplied from the torque/yow-rate conversion section 53 is negative.

Since the target turning angle δγ is also a function of the vehicle speed V and the yaw rate γ as shown in the following equation 21, the target turning angle δγ can also be calculated by the computation of the following equation 21, instead of referring to the table.

$$\delta\gamma = L \cdot (1 + A \cdot V^2) \cdot \gamma d / V \qquad \text{Equation 21}$$

In the equation 21, L is a given value determined beforehand showing a wheel base and A is a given value determined beforehand.

Figure 9:
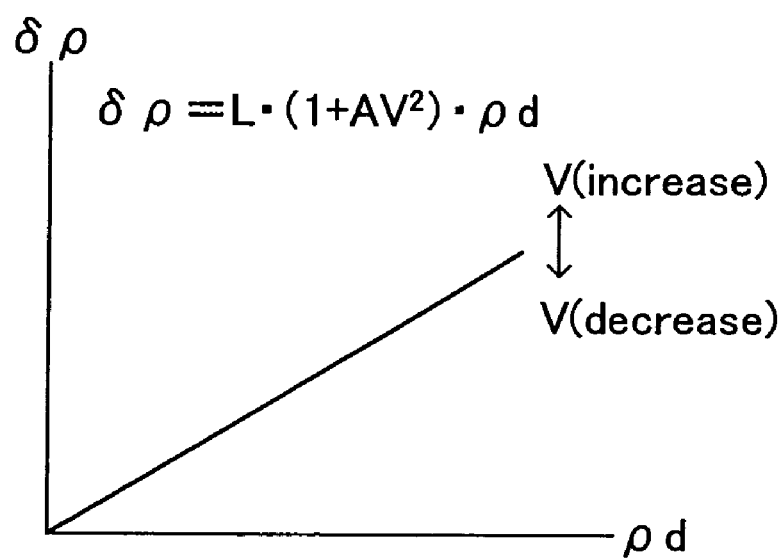
FIG. 9 is a graph showing a relationship between an anticipated turning curvature and a target turning angle.

The turning angle conversion section 57 calculates the target turning angle δρ of the right and left front wheels FW1 and FW2 necessary for generating the calculated anticipated turning curvature ρd. As shown in FIG. 9, the turning angle conversion section 57 has a table representing a changing characteristic of the target turning angle δρ, that changes according to the vehicle speed V, with respect to the anticipated turning curvature ρd. This table is a set of data collected by running the vehicle as the vehicle speed V is changed and measuring beforehand the turning angle δ of the right and left front wheels FW1 and FW2 and the turning curvature ρ. The turning angle conversion section 57 refers to this table for calculating the target turning angle δρ corresponding to the inputted anticipated turning curvature ρd and the detected vehicle speed V inputted from the vehicle speed sensor 33. Although the turning curvature ρ (anticipated turning curvature ρd) and the target turning angle δρ stored in the table are both positive, the outputted target turning angle δρ becomes negative if the anticipated turning curvature ρd supplied from the torque/curvature conversion section 54 is negative.

Since the target turning angle δρ is also a function of the vehicle speed V and the turning curvature ρ as shown in the following equation 22, the target turning angle δρ can also be calculated by the computation of the following equation 22, instead of referring to the table.

$$\delta\rho = L \cdot (1 + A \cdot V^2) \cdot \rho d \qquad \text{Equation 22}$$

In the equation 22, L is a given value determined beforehand showing a wheel base and A is a given value determined beforehand.

As described above, the calculated target turning angles δg, δγ and δρ are supplied to the turning angle deciding section 58. The turning angle deciding section 58 selects, among the target turning angles δg, δγ and δρ, the target turning angle having an optimum steering characteristic in the current vehicle speed V based upon the detected vehicle speed V detected by the vehicle speed sensor 33 and decides the selected turning angle as the target turning angle δd. More specifically, the target turning angles δg, δγ and δρ can be calculated respectively based upon the equations 20, 21 and 22. In case where the anticipated turning curvature ρd is adopted, for example, as the motion state quantity when the vehicle speed V is great (hereinafter referred to as high-speed driving), a gain (value) of the target turning angle δρ of the right and left front wheels FW1 and FW2 corresponding to the anticipated turning curvature ρd (steering angle θ) is rapidly increased as apparent from the equation 20, so that the realistic steering characteristic cannot be obtained. Further, in case where the anticipated lateral acceleration Gd is adopted, for example, as the motion state quantity when the vehicle speed V is small (hereinafter referred to as low-speed driving), a gain (value) of the target turning angle δg of the right and left front wheels FW1 and FW2 corresponding to the anticipated lateral acceleration Gd (steering angle θ) is rapidly increased as apparent from the equation 20, so that the realistic steering characteristic cannot also be obtained. Moreover, in case where the anticipated yaw rate γd is adopted, for example, as the motion state quantity when the vehicle speed V is much small, a gain (value) of the target turning angle δγ of the right and left front wheels FW1 and FW2 to the anticipated yaw rate γd (steering angle θ) is rapidly increased as apparent from the equation 21, so that the realistic steering characteristic cannot also be obtained.

Therefore, the turning angle deciding section 58 selects the target turning angles δg, δγ and δρ such that the variation quantity in the increase or decrease of the gain (value) of the turning angle δ of the right and left front wheels FW1 and FW2 corresponding to the change in the motion state quantity (specifically, the steering angle θ) becomes small, i.e., such that the optimum (realistic) steering characteristic can be secured according to the current vehicle speed V, and decides the selected target turning angle as the target turning angle δd. Specifically, in case where the vehicle is running with high speed, the turning angle deciding section 58 selects the target turning angle δg, corresponding to the anticipated lateral acceleration Gd, whose gain (value) has the minimum variation quantity upon the high speed driving. Further, in case where the vehicle is running with low speed, the turning angle deciding section 58 selects the target turning angle δρ, corresponding to the anticipated turning curvature ρd, whose gain (value) has the minimum variation quantity upon the low speed driving. Moreover, in case where the vehicle is running with medium speed wherein the vehicle speed V is great to some degree, the turning angle deciding section 58 selects the target turning angle δγ, corresponding to the anticipated yaw rate γd, whose gain (value) has the minimum variation quantity upon the medium speed driving. As described above, the target turning angle whose gain (value) has the minimum variation quantity is selected from the target turning angles δg, δγ and δρ at each speed area, whereby the rapid vehicle turning can be prevented at all speed areas to the turning amount (i.e., steering angle θ) of the steering handle 11 by the driver. Further, the rapid variation in the gain (value) of the target turning angle with a slight speed change can be prevented. Accordingly, the driver can easily drive the vehicle without having a sense of incongruity, since the steering characteristic optimum for the current vehicle speed V can be obtained. Then, the turning angle deciding section 58 decides the target turning angle selected from the target turning angles δg, δγ and δρ as the target turning angle δd.

The target turning angle δd decided in this manner is supplied to a turning angle correcting section 61 of the turning control section 60. The turning angle correcting section 61 corrects the target turning angle δd supplied from the turning angle deciding section 58 and calculates a corrected target turning angle δda. More specifically, the turning angle correcting section 61 inputs the anticipated lateral acceleration Gd from the torque/lateral-acceleration conversion section 52 as well as inputs the actual lateral acceleration G detected by the lateral acceleration sensor 34. In case where the supplied target turning angle δd is the target turning angle δg, it executes the computation of the following equation 23 for calculating the corrected target turning angle δda.

$$\delta da = \delta g + K3 \cdot (Gd - G) \qquad \text{Equation 23}$$

The coefficient K3 is a predetermined positive constant that is corrected to a sign by which the absolute value of the corrected target turning angle δda is increased, in case where the actual lateral acceleration G is less than the anticipated lateral acceleration Gd. Further, it is corrected to a sign by which the absolute value of the corrected target turning angle δda is decreased, in case where the actual lateral acceleration G exceeds the anticipated lateral acceleration Gd. This correction ensures the turning angles of the right and left front wheels FW1 and FW2 necessary for the anticipated lateral acceleration Gd with high precision.

The turning angle correcting section 61 inputs the anticipated yaw rate γd from the torque/yaw-rate conversion section 53 as well as inputs the actual yaw rate γ detected by the yaw rate sensor 35. In case where the supplied target turning angle δd is the target turning angle δγ, the turning angle correcting section 61 executes the computation of the following equation 24 for calculating the corrected target turning angle δda.

$$\delta da = \delta \gamma + K4 \cdot (\gamma d - \gamma) \qquad \text{Equation 24}$$

The coefficient K4 is a predetermined positive constant that is corrected to a sign by which the absolute value of the corrected target turning angle δda is increased, in case where the actual yaw rate γ is less than the anticipated yaw rate γd. Further, it is corrected to a sign by which the absolute value of the corrected target turning angle δda is decreased, in case where the actual yaw rate γ exceeds the anticipated yaw rate γd. This correction ensures the turning angles of the right and left front wheels FW1 and FW2 necessary for the anticipated yaw rate γd with high precision.

The turning angle correcting section 61 further inputs the anticipated turning curvature ρd from the torque/curvature conversion section 54 as well as inputs the actual turning curvature ρ from the turning curvature calculating section 62. The turning curvature calculating section 62 calculates the actual turning curvature ρ by the execution of the computation of the following equation 25 by using the lateral acceleration G detected by the lateral acceleration sensor 34 or yaw rate γ detected by the yaw rate sensor 35 and the vehicle speed V detected by the vehicle speed sensor 33, and outputs the resultant to the turning angle correcting section 61.

$$\rho = G/V^2 \text{ or } \rho = \gamma/V \qquad \text{Equation 25}$$

Then, the turning angle correcting section 61 executes the computation of the following equation 26 for calculating the corrected target turning angle δda, in case where the supplied target turning angle δd is the target turning angle ρd.

$$\delta da = \delta d + K5 \cdot (\rho d - \rho) \qquad \text{Equation 26}$$

The coefficient K5 is a predetermined positive constant that is corrected to a sign by which the absolute value of the corrected target turning angle δda is increased, in case where the actual turning curvature ρ is less than the anticipated turning curvature ρd. Further, it is corrected to a sign by which the absolute value of the corrected target turning angle δda is decreased, in case where the actual turning curvature ρ exceeds the anticipated turning curvature ρd. This correction ensures the turning angles of the right and left front wheels FW1 and FW2 necessary for the anticipated turning curvature ρd with high precision.

The calculated corrected target turning angle δda is supplied to a drive control section 63. The drive control section 63 inputs the actual turning angle δ detected by the turning angle sensor 32 and feedback-controls the rotation of the electric motor in the turning actuator 21 such that the right and left front wheels FW1 and FW2 are turned into the corrected target turning angle δda. Further, the drive control section 63 also inputs the driving current flowing from the driving circuit 38 to the electric motor and feedback-controls the driving circuit 38 such that the driving current having a magnitude corresponding to the turning torque appropriately flows through the electric motor. By the drive control of the electric motor in the turning actuator 21, the rotation of the electric motor is transmitted to the pinion gear 23 via the turning output shaft 22, thereby displacing the rack bar 24 in the shaft direction by the pinion gear 23. The displacement of the rack bar 24 in the shaft direction turns the right and left front wheels FW1 and FW2 into the corrected target turning angle δda.

As understood from the explanation of the operation, the steering angle θ as the operation input value by the driver to the steering handle 11 is converted into the steering torque Td at the displacement/torque conversion section 51 according to the first embodiment. The converted steering torque Td is supplied to the torque/lateral-acceleration conversion section 52, torque/yaw-rate conversion section 53 and torque/curvature conversion section 54 to be converted into the anticipated lateral acceleration Gd, anticipated yaw rate γd and anticipated turning curvature ρd. The converted anticipated lateral acceleration Gd, anticipated yaw rate γd and anticipated turning curvature ρd are respectively supplied to the turning angle conversion sections 55, 56 and 57 where the target turning angles δg, δγ and δρ are calculated.

The calculated target turning angles δg, δγ and δρ are supplied to the turning angle deciding section 58. The turning angle deciding section 58 decides the target turning angle δd according to the detected vehicle speed V, whereby the right and left front wheels FW1 and FW2 are turned into the corrected target turning angle δda by the turning angle correcting section 61 and drive control section 63. In this case, the steering torque Td is a physical quantity that can be perceived by the driver from the steering handle 11 due to the action of the reaction force actuator 13. The steering torque Td is also changed in the manner of exponential function with respect to the steering angle θ. Therefore, the driver can turn the steering handle 11 according to the man's perception characteristic, while feeling the reaction force according to the Weber-Fechner's law. Further, the actual lateral acceleration G, actual yaw rate γ and actual turning curvature ρ generated on the vehicle due to the turning of the right and left front wheels FW1 and FW2 are also the physical quantities that can be perceived, and each of these values G, γ and ρ are controlled so as to be equal to the anticipated lateral acceleration Gd, anticipated yaw rate γd or anticipated turning curvature ρd.

The anticipated lateral acceleration Gd, anticipated yaw rate γd and anticipated turning curvature ρd are also changed in the manner of exponentiation function (e.g., in the manner of exponential function with respect to the steering angle θ by changing the equation 4 to the equation 9) with respect to the steering torque Td calculated from the steering angle θ inputted by the driver. Accordingly, the driver can turn the steering handle 11 according to the man's perception characteristic, while feeling the lateral acceleration in accordance with the Weber-Fechner's law, thereby being capable of turning the vehicle. As a result, the driver can operate the steering handle 11 as adapted to the man's perception characteristic, thereby being capable of easily driving the vehicle.

Further, the anticipated lateral acceleration Gd, anticipated yaw rate γd and anticipated turning curvature ρd are calculated and the corresponding target turning angles δg, δγ and δρ are calculated respectively, whereby at least one of the target turning angles δg, δγ and δρ can be selected and decided as the target turning angle δd based upon the detected vehicle speed V. This makes it possible to turn the steering handle 11 as adapted to the man's perception characteristic in all vehicle speed areas. Thus, the driver can easily drive the vehicle in all speed areas without having a sense of incongruity.

The turning angle correcting section 61 corrects the target turning angle δd (target turning angle δg, target turning angle δγ and target turning angle δρ) such that the actual lateral acceleration G, actual yaw rate γ and actual turning curvature ρ actually generated on the vehicle correctly correspond to the steering angle θ of the steering handle 11, whereby the actual lateral acceleration G, actual yaw rate γ and actual turning curvature ρ correctly corresponding to the steering angle θ of the steering handle 11 are generated on the vehicle. As a result, the driver can turn the steering handle 11, while sensing the lateral acceleration correctly adapting to the man's perception characteristic. Therefore, driving the vehicle is more facilitated.

Second Embodiment

In the first embodiment, the turning angle deciding section 58 selects the target turning angle, that has the smallest variation quantity of the gain (value) of the turning angle, among the target turning angle δg, target turning angle δγ and target turning angle δρ based upon the vehicle speed V, and decides the selected target turning angle as the target turning angle δd. On the other hand, it is possible to calculate and decide the target turning angle δd based upon the vehicle speed V as the ratio of the target turning angle δg, target turning angle δγ and target turning angle δρ is continuously changed. A vehicle steering apparatus according to the second embodiment will be explained hereinafter. In the vehicle steering apparatus according to the second embodiment, the computer program executed by the electronic control unit 36 is slightly different from the first embodiment, but the configuration of the steering apparatus is the same as that of the first embodiment. Therefore, same numerals are given to the components same as those in the first embodiment for omitting the detailed explanation thereof.

Figure 10:
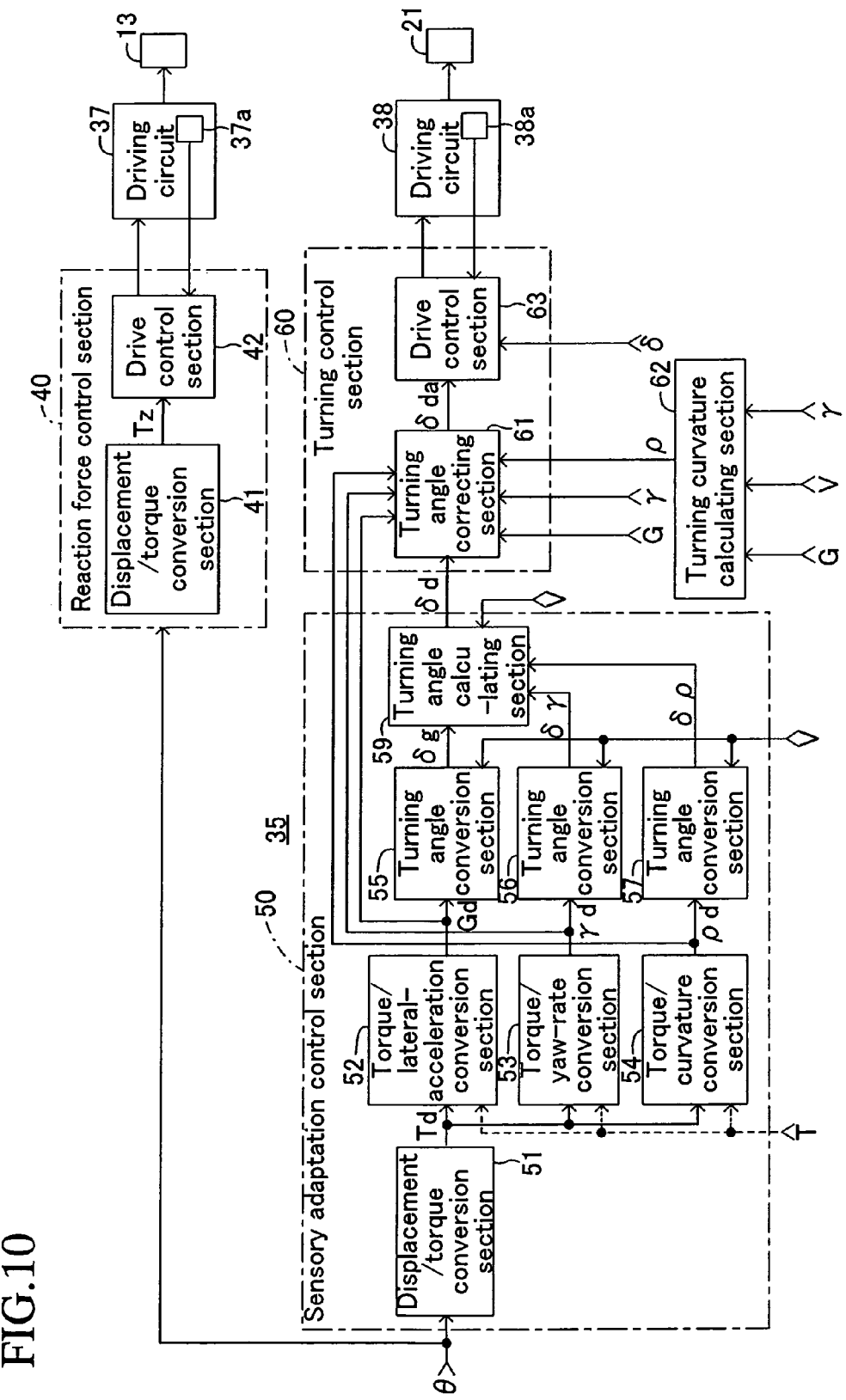
FIG. 10 is a functional block diagram functionally showing a computer program processing executed by an electronic control unit of FIG. 1 according to the second embodiment.

In the second embodiment, the computer program executed by the electronic control unit 36 is shown by a functional block diagram of FIG. 10. In this case, at the sensory adaptation control section 50, the displacement/torque conversion section 51, torque/lateral-acceleration conversion section 52, torque/yaw-rate conversion section 53, torque-curvature conversion section 54 and each turning angle conversion section 55, 56 and 57 function in the same manner as in the first embodiment, and a turning angle calculating section 59 is provided instead of the turning angle deciding section 58 of the first embodiment.

The turning angle calculating section 59 changes, in accordance with the following equation 27, the ratio of the target turning angle δg, target turning angle δγ and target turning angle δρ supplied from each turning angle conversion section 55, 56 and 57 according to the detected vehicle speed V, and each of the target turning angles δg, δγ and δρ whose ratio is changed is added up to calculate the target turning angle δd.

$$\delta d = Kg \cdot \delta g + K\gamma \cdot \delta\gamma + K\rho \cdot \delta\rho \qquad \text{Equation 27}$$

Kg, Kγ and Kρ are variables each representing the ratio of the target turning angles δg, δγ and δρ. The relationship represented by the following equation 28 is established among each variable Kg, Kγ and Kρ. It should be noted that each variable Kg, Kγ and Kρ is changed according to the vehicle speed V.

$$Kg + K\gamma + K\rho = 1 \qquad \text{Equation 28}$$

Figure 11:
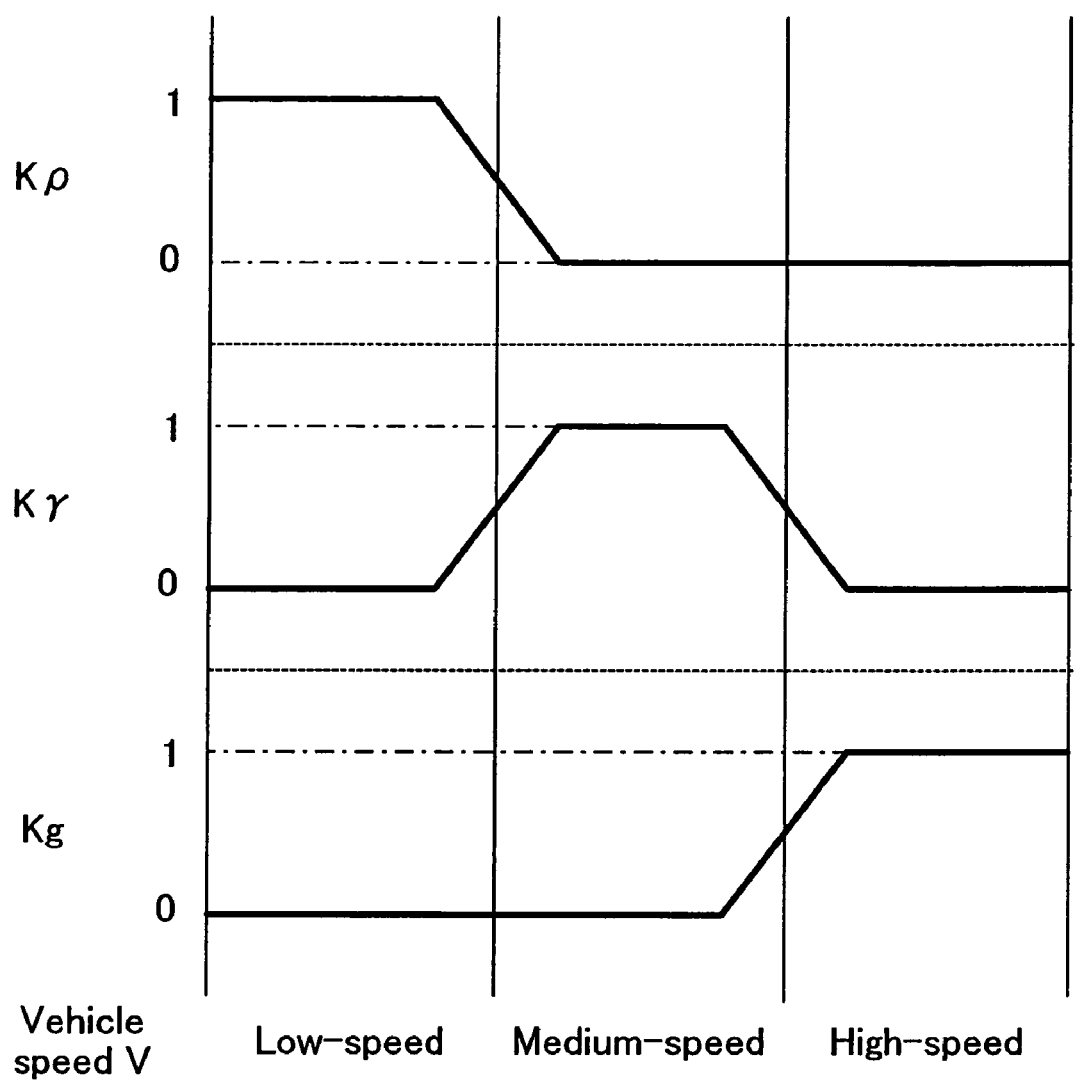
FIG. 11 is a graph for explaining a change in a ratio of the target turning angle calculated at the turning angle calculating section of FIG. 10.

The computation at the turning angle calculating section 59 will be specifically explained. Like the turning angle deciding section 58 in the first embodiment, the target turning angle δg is selected upon the high-speed driving, the target turning angle δγ is selected upon the medium-speed driving and the target turning angle δρ is selected upon the low-speed driving, even in the computation at the turning angle calculating section 59. Therefore, each of the variables Kg, Kγ and Kρ has the changing characteristic with respect to the vehicle speed as shown in FIG. 11. More specifically, the variable Kg is set to "1" and the variables Kγ and Kρ are set to "0" respectively upon the high-speed driving, in accordance with the equation 28. The variable Kγ is set to "1" and the variables Kg and Kρ are set to "0" respectively upon the medium-speed driving. The variable Kρ is set to "1" and the variables Kg and Kγ are set to "0" respectively upon the low-speed driving. This makes the target turning angle δd calculated in accordance with the equation 27 equal to the target turning angle δg upon the high-speed driving, equal to the target turning angle δγ at the medium-speed driving and equal to the target turning angle δρ upon the low-speed driving.

Further, when the speed area is changed, each of the variables Kg, Kγ and Kρ is uniformly increased or decreased. In other words, each of the variables Kg, Kγ and Kρ is changed in the manner of linear function having a predetermined slope. More specifically explained, in case where the vehicle speed V is changed from the high-speed area to the medium-speed area, for example, the value of the variable Kg is uniformly changed from "1" to "0" and the value of the variable Kγ is uniformly changed from "0" to "1". In case where the vehicle speed V is changed from the medium-speed area to the low-speed area, the value of the variable Kγ is uniformly changed from "1" to "0" and the value of the variable Kρ is uniformly changed from "0" to "1". Each of the variables Kg, Kγ and Kρ may be changed in accordance with the vehicle speed V, so that, instead of the variables that are changed in the manner of linear function, it is possible to adopt a variable that is changed in the manner of quadratic function with the vehicle speed V as a variable or a variable that is changed in the manner of exponential function.

As described above, the value of each variable Kg, Kγ and Kρ, i.e., the ratio of the target turning angle δg, the target turning angle δγ and the target turning angle δρ is changed in accordance with the vehicle speed V, and the added and calculated target turning angle δd is supplied to the turning angle correcting section 61 like the first embodiment. Then, the supplied target turning angle δd is corrected by the turning angle correcting section 61 to calculate the corrected target turning angle δda, whereby the right and left front wheels FW1 and FW2 are controlled by the drive control section 63 so as to turn into the corrected target turning angle δda.

As can be understood from the explanation about the operation, the turning angle calculating section 59 uniformly increases or decreases the ratio of the values of each variable Kg, Kγ and Kρ, i.e., the ratio of the target turning angle δg, the target turning angle δγ and the target turning angle δρ, when the speed area is changed, thereby calculating the target turning angle δd that is continuously changed in each speed area. According to this, the steering characteristic can be continuously changed, with the result that the driver can easily drive the vehicle without having a sense of incongruity caused by the change in the speed area. The other effects are the same as those in the first embodiment.

Third Embodiment

In the first embodiment, the turning angle deciding section 58 selects the target turning angle, that has the smallest variation quantity of the gain (value) of the turning angle, among the target turning angle δg, target turning angle δγ and target turning angle δρ based upon the vehicle speed V, and decides the selected target turning angle as the target turning angle δd. The reason of this is as follows. In case where the target turning angle δg is selected and decided as the target turning angle δd, for example, the gain (value) of the target turning angle δg upon the low-speed driving, particularly upon the dead low-speed driving, becomes extremely great as apparent from the equation 20, thereby being unable to obtain the realistic steering characteristic. Therefore, the target turning angle δρ is selected and decided as the target turning angle δd upon the low-speed driving for obtaining a realistic steering characteristic.

However, when the target turning angle δρ is selected in case where the vehicle runs (moves) in dead low-speed such as parking the vehicle, for example, the changing amount with respect to the anticipated turning curvature ρd (steering angle θ) of the gain (value) is small, so that there may be a case where the driver has to turn more the steering handle 11 in order to obtain the desired actual turning angle δ. Therefore, when the vehicle runs (moves) with a dead low-speed, there may be a case where the right and left front wheels FW1 and FW2 are greatly turned with respect to the turning operation of the steering handle 11 by a driver, i.e., with respect to the steering angle θ. In this connection, the third embodiment will be explained hereinafter wherein the right and left front wheels FW1 and FW2 are greatly turned upon the low-speed driving, in particular, upon the dead low-speed driving. In the vehicle steering apparatus according to the third embodiment, the computer program executed by the turning angle deciding section 58 in the electronic control unit 36 is slightly different from the first embodiment, but the configuration of the steering apparatus is the same as that of the first embodiment. Therefore, same numerals are given to the components same as those in the first embodiment for omitting the detailed explanation thereof.

Figure 12:
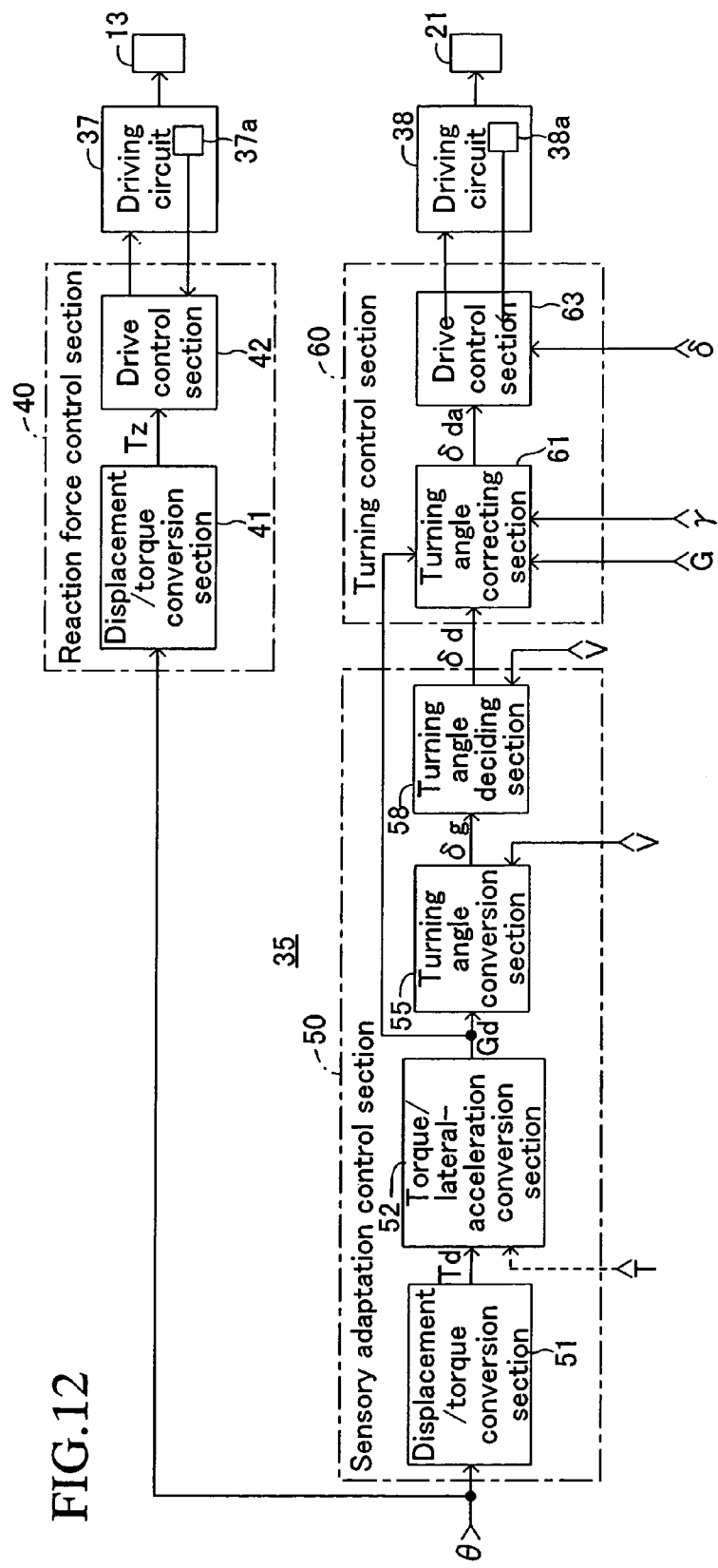
FIG. 12 is a functional block diagram functionally showing a computer program processing executed by an electronic control unit of FIG. 1 according to the third embodiment.

In the third embodiment, the computer program executed by the electronic control unit 36 is shown by a functional block diagram of FIG. 12. In this case, at the sensory adaptation control section 50, the displacement/torque conversion section 51, torque/lateral-acceleration conversion section 52 and turning angle conversion section 55 function in the same manner as in the first embodiment, and the torque/yaw-rate conversion section 53, torque/curvature conversion section 54 and turning angle conversion sections 56 and 57 are omitted. Further, the turning curvature calculating section 62 is omitted at the turning control section 60. Therefore, only the target turning angle δg is supplied from the turning angle conversion section 55 to the turning angle deciding section 58 in the third embodiment.

The turning angle deciding section 58 in the third embodiment decides the target turning angle δd based only upon the supplied target turning angle δg. More specifically explained, the target turning angle δg is calculated as the function of the vehicle speed V and the lateral acceleration G (anticipated lateral acceleration Gd) based upon the equation 20 as explained in detail in the first embodiment. Therefore, when the detected vehicle speed V is extremely small, the gain (value) of the target turning angle δg is rapidly increased, resulting in that the realistic steering characteristic cannot be obtained.

On the other hand, the turning angle deciding section 58 in the third embodiment sets beforehand the lower limit value (constant value) relating to the vehicle speed. When the vehicle speed V detected by the vehicle speed sensor 33 is smaller than the lower limit value, the turning angle deciding section 58 calculates the target turning angle δg by using the lower limit value as the vehicle speed V in the equation 20. This makes the predetermined values L, A and vehicle speed V in the equation 20 constant, whereby the target turning angle δg has the fixed relation with the anticipated lateral acceleration Gd. Accordingly, even in case where the vehicle speed V is extremely small, the rapid increase in the gain (value) of the target turning angle δg can be prevented, thereby being capable of obtaining a realistic steering characteristic.

On the other hand, even in case where the vehicle runs with a medium speed or high speed, the turning angle deciding section 58 decides the target turning angle δg as the target turning angle δd. In this case, the variation quantity of the gain (value) of the target turning angle δd slightly increases when the vehicle runs with the medium speed. However, the steering characteristic is not greatly deteriorated, compared to the target turning angle δγ decided in accordance with the equation 21 in the first embodiment. As described above, the target turning angle δg decided as the target turning angle δd by the turning angle deciding section 58 is supplied to the turning angle correcting section 61, and corrected in the same manner in the first embodiment. Then, the corrected target turning angle δda is supplied to the drive control section 63. According to this, the right and left front wheels FW1 and FW2 are controlled so as to turn into the corrected target turning angle δda.

As can be understood from the aforesaid explanation of the operation, the target turning angle δd is decided based upon the same motion state quantity, i.e., the anticipated lateral acceleration Gd, in all speed areas according to the third embodiment. Thus, even in case where the vehicle speed area is changed, for example, the right and left front wheels FW1 and FW2 can smoothly be turned, thereby being capable of effectively reducing a sense of incongruity sensed by a driver. Further, the target turning angle δd is decided based upon a single motion state quantity, so that the computer program executed by the electronic control unit 36 can be simplified.

Subsequently explained is a modified example wherein the steering torque T is utilized as the operation input value of the steering handle 11. As shown by a broken line in FIG. 1, this modified example is provided with a steering torque sensor 39 that is attached to the steering input shaft 12 for detecting the steering torque T exerted on the steering handle 11. The other configurations are the same as those of the first embodiment, but the computer program executed by the electronic control unit 36 is slightly different from the first embodiment.

In this modified example, the displacement/torque conversion section 51 is not provided, and the torque/lateral-acceleration conversion section 52, the torque/yaw-rate conversion section 53 and the torque/curvature conversion section 54 calculate the anticipated lateral acceleration Gd, anticipated yaw rate γd and anticipated turning curvature ρd by the execution of the computation of the equations 3 to 8 using the steering torque T detected by the steering torque sensor 39 instead of the steering torque Td calculated by the displacement/torque conversion section 51, in the functional block diagram of FIG. 2 representing the computer program. In this case too, the anticipated lateral acceleration Gd, anticipated yaw rate γd and anticipated turning curvature ρd may be calculated by using a table representing the characteristic shown in FIGS. 4 to 6 instead of the execution of the computation of the equations 3 to 8. The other program processing executed by the electronic control unit 36 is the same as that in the first embodiment.

According to this modified example, the steering torque T serving as the operation input value of the driver to the steering handle 11 is converted into the anticipated lateral acceleration Gd, anticipated yaw rate γd and anticipated turning curvature ρd by the torque/lateral-acceleration conversion section 52, the torque/yaw-rate conversion section 53 and the torque/curvature conversion section 54. The converted anticipated lateral acceleration Gd, anticipated yaw rate γd or anticipated turning curvature ρd is decided as the target turning angle δd by the turning angle conversion sections 55, 56 and 57 and the turning angle deciding section 58, whereby the right and left front wheels FW1 and FW2 are turned into the corrected target turning angle δda by the turning angle correcting section 61 and the drive control section 63. In this case too, the steering torque T is a physical quantity that the driver can perceive from the steering handle 11 and the anticipated lateral acceleration Gd, anticipated yaw rate γd and anticipated turning curvature ρd are also changed in the manner of exponentiation function (e.g., in the manner of exponential function with respect to the steering angle θ by changing the equation 4 to the equation 9) with respect to the steering torque T. Accordingly, the driver can turn the steering handle 11 according to the man's perception characteristic, while feeling the reaction force in accordance with the Weber-Fechner's law. Accordingly, in this modification example too, the driver can turn the steering handle 11 according to the man's perception characteristic, while feeling the lateral acceleration in accordance with the Weber-Fechner's law, thereby being capable of turning the vehicle, like the first embodiment. Therefore, the same effect as the first embodiment is expected.

Further, the steering control by the first embodiment and the steering control by the modified example may be changed over. Specifically, the steering angle sensor 31 and the steering torque sensor 39 are both provided, wherein the change-over can be carried out between the case where the anticipated lateral acceleration Gd, anticipated yaw rate γd and anticipated turning curvature ρd are calculated by using the target steering torque Td calculated at the displacement/torque conversion section 51 like the first embodiment and the case where the anticipated lateral acceleration Gd, anticipated yaw rate γd and anticipated turning curvature ρd are calculated by using the steering torque T detected by the steering torque sensor 39. In this case, the change-over may automatically be changed according to the intention of the driver or according to the vehicle motion state.

OTHER MODIFIED EXAMPLE

The present invention is not limited to the first to third embodiments and the modified example, and various modifications are possible without departing from the spirit of the present invention.

For example, the steering handle 11 that is turned for steering the vehicle is used in the first to third embodiments and the modified example. However, instead of this, a steering handle of a joy stick type that linearly displaces may be used, or any other steering handles can be used so long as they are operated by the driver and can instruct the steering to the vehicle.

In the first to third embodiments and the modified example, the turning output shaft 22 is rotated by using the turning actuator 21, thereby turning the right and left front wheels FW1 and FW2. However, instead of this, the right and left front wheels FW1 and FW2 may be turned by linearly displacing the rack bar 24 by using the turning actuator 13.

What is claimed is:

1. A vehicle steering apparatus of a steer-by-wire system provided with a steering handle operated by a driver for steering a vehicle, a turning actuator for turning steered wheels and a turning control device that drives and controls the turning actuator according to the operation on the steering handle for turning the steered wheels, wherein the turning control device comprises:
   operation input value detecting means that detects an operation input value by a driver to the steering handle;
   vehicle speed detecting means that detects a vehicle speed;
   motion state quantity calculating means that calculates plural anticipated motion state quantities of the vehicle by using the detected operation input value, wherein the plural anticipated motion state quantities of the vehicle represent the vehicle motion state, that relates to a turn of the vehicle and can be sensed by a driver, and are in the predetermined relation of exponential function or in the predetermined relation of exponentiation function with the operation input value to the steering handle;
   turning angle calculating means that calculates a turning angle of the steered wheels necessary for the vehicle to turn with each of the anticipated motion state quantities calculated by the motion state quantity calculating means by using each of the anticipated motion state quantities;
   turning angle deciding means that selects and decides at least one turning angle, among each of the turning angles, that correspond to each of the anticipated motion state quantities and are calculated by the turning angle calculating means, based upon the vehicle speed detected by the vehicle speed detecting means; and
   turning control means that controls the turning actuator according to the turning angle decided by the turning angle deciding means for turning the steered wheels into the decided turning angle.

2. A vehicle steering apparatus of a steer-by-wire system according to claim 1, wherein the turning angle deciding means decides at least one turning angle by changing the ratio of each turning angle, that corresponds to each of the anticipated motion state quantities and is calculated by the turning angle calculating means, to the vehicle speed detected by the vehicle speed detecting means.

3. A vehicle steering apparatus of a steer-by-wire system according to claim 2, wherein the changed ratio is represented by a function having the detected vehicle speed as a variable.

4. A vehicle steering apparatus of a steer-by-wire system according to claim 1, wherein
the operation input value detecting means is composed of a displacement amount sensor that detects a displacement amount of the steering handle, and
the motion state quantity calculating means is composed of operation force conversion means that converts the detected displacement amount into the operation force exerted on the steering handle and motion state quantity conversion means that converts the converted operation force into the anticipated motion state quantity.

5. A vehicle steering apparatus of a steer-by-wire system according to claim 1, wherein
the operation input value detecting means is composed of an operation force sensor that detects the operation force exerted on the steering handle, and
the motion state quantity calculating means is composed of motion state quantity conversion means that converts the detected operation force into the anticipated motion state quantity.

6. A vehicle steering apparatus of a steer-by-wire system according to claim 1, wherein the anticipated motion state quantity is at least one of a vehicle lateral acceleration, vehicle yaw rate and vehicle turning curvature.

7. A vehicle steering apparatus of a steer-by-wire system according to claim 1 further comprising:
motion state quantity detecting means that detects actual motion state quantity that is the same type of the anticipated motion state quantity and represents the actual motion state; and
correcting means that corrects the calculated turning angle according to the difference between the calculated anticipated motion state quantity and the detected actual motion state quantity.

8. A vehicle steering apparatus of a steer-by-wire system according to claim 1 further comprising:
reaction force device that gives reaction force to the operation on the steering handle.

9. A vehicle steering apparatus of a steer-by-wire system according to claim 1, wherein
the anticipated motion state quantities include a vehicle lateral acceleration and a vehicle turning curvature; and
the turning angle deciding means selects the turning angle corresponding to the vehicle lateral acceleration when the vehicle speed is relative high and selects the turning angle corresponding to the vehicle turning curvature when the vehicle speed is relative low.

10. A vehicle steering apparatus of a steer-by-wire system according to claim 1, wherein
the anticipated motion state quantities include a vehicle lateral acceleration, a vehicle yaw rate and a vehicle turning curvature; and
the turning angle deciding means selects the turning angle corresponding to the vehicle lateral acceleration when the vehicle speed is relative high, selects the turning angle corresponding to the vehicle turning curvature when the vehicle speed is relative low and selects the turning angle corresponding to the vehicle yaw rate when the vehicle speed is relative middle.

11. A vehicle steering apparatus of a steer-by-wire system provided with a steering handle operated by a driver for steering a vehicle, a turning actuator for turning steered wheels and a turning control device that drives and controls the turning actuator according to the operation on the steering handle for turning the steered wheels, wherein the turning control device comprises:
operation input value detecting means that detects an operation input value by a driver to the steering handle;
vehicle speed detecting means that detects a vehicle speed;
motion state quantity calculating means that calculates an anticipated motion state quantity of the vehicle by using the detected operation input value, wherein the anticipated motion state quantity of the vehicle represents the vehicle motion state, that relates to a turn of the vehicle and can be sensed by a driver, and is in the predetermined relation of exponential function or in the predetermined relation of exponentiation function with the operation input value to the steering handle;
turning angle calculating means that calculates a turning angle of the steered wheels necessary for the vehicle to turn with the anticipated motion state quantity calculated by the motion state quantity calculating means by using the detected vehicle speed and the anticipated motion state quantity; and
turning control means that controls the turning actuator according to the turning angle calculated by the turning angle calculating means for turning the steered wheels into the calculated turning angle, wherein
the turning angle calculating means calculates the turning angle of the steered wheels with the vehicle speed used for the calculation made constant when the vehicle speed detected by the vehicle speed detecting means is not more than a predetermined vehicle speed.

12. A vehicle steering apparatus of a steer-by-wire system according to claim 11, wherein
the operation input value detecting means is composed of a displacement amount sensor that detects a displacement amount of the steering handle, and
the motion state quantity calculating means is composed of operation force conversion means that converts the detected displacement amount into the operation force exerted on the steering handle and motion state quantity conversion means that converts the converted operation force into the anticipated motion state quantity.

13. A vehicle steering apparatus of a steer-by-wire system according to claim 11, wherein
the operation input value detecting means is composed of an operation force sensor that detects the operation force exerted on the steering handle, and
the motion state quantity calculating means is composed of motion state quantity conversion means that converts the detected operation force into the anticipated motion state quantity.

14. A vehicle steering apparatus of a steer-by-wire system according to claim 11, wherein the anticipated motion state quantity is at least one of a vehicle lateral acceleration, vehicle yaw rate and vehicle turning curvature.

15. A vehicle steering apparatus of a steer-by-wire system according to claim 11 further comprising:
motion state quantity detecting means that detects actual motion state quantity that is the same type of the anticipated motion state quantity and represents the actual motion state; and
correcting means that corrects the calculated turning angle according to the difference between the calculated anticipated motion state quantity and the detected actual motion state quantity.

16. A vehicle steering apparatus of a steer-by-wire system according to claim 11 further comprising:
reaction force device that gives reaction force to the operation on the steering handle.

* * * * *